United States Patent [19]

Lerner et al.

[11] Patent Number: 5,821,873
[45] Date of Patent: *Oct. 13, 1998

[54] METHOD AND APPARATUS FOR SAVING POWER IN A SELECTIVE CALL RECEIVER

[75] Inventors: Kenneth S. Lerner, Boca Raton; John M. Burgan, Nouth Palm Beach, both of Fla.

[73] Assignee: Motorola, Inc., Schaumburg, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 507,087

[22] Filed: Jul. 26, 1995

[51] Int. Cl.$^6$ ............................... G08B 5/22; H04L 7/00; H04B 7/00
[52] U.S. Cl. ............................... 340/825.44; 340/825.21; 455/38.3
[58] Field of Search ..................... 340/825.21, 825.44, 340/825.27; 455/38.3, 343

[56] References Cited

U.S. PATENT DOCUMENTS

| | | | |
|---|---|---|---|
| 4,713,808 | 12/1987 | Gaskill et al. | 340/825.44 |
| 4,804,954 | 2/1989 | Macnak et al. | 340/825.44 |
| 4,839,641 | 6/1989 | Mori et al. | 340/825.47 |
| 5,376,929 | 12/1994 | Rakolta et al. | 340/825.44 |
| 5,392,457 | 2/1995 | Davis et al. | 455/38.3 |
| 5,430,437 | 7/1995 | Ichikawa et al. | 455/38.3 |
| 5,459,457 | 10/1995 | Sharpe | 455/38.3 |
| 5,493,282 | 2/1996 | Petreye | 340/825.27 |
| 5,555,183 | 9/1996 | Willard et al. | 340/825.21 |
| 5,587,706 | 12/1996 | Branner et al. | 455/38.3 |

*Primary Examiner*—Brian Zimmerman
*Assistant Examiner*—Edward Merz
*Attorney, Agent, or Firm*—Philip P. Macnak

[57] ABSTRACT

A method for reducing power consumption in a selective call receiver includes the steps of first receiving a paging signal that includes a preamble and a plurality of batches, each of the batches having a synchronization codeword and a plurality of frames including at least an address information, detecting a skip code within one of the batches, skipping a predetermined number of batches without decoding any address information contained therein in response to the skip code, and decoding the address information of a one of the batches next subsequent to the predetermined number of batches. The skip code can be encoded in a portion of the signal, such as the synchronization codeword of the one of the batches, the address information of the one of the batches, and a selected frame of the one of the batches. The predetermined number can be contained in either of a codeplug in the selective call receiver or the signal portion containing the skip code.

6 Claims, 5 Drawing Sheets

FIG. 1 – PRIOR ART –

METHOD AND APPARATUS FOR SAVING POWER IN A SELECTIVE CALL RECEIVER

FIELD OF THE INVENTION

The present invention relates to selective call receivers, and, more particularly, to methods for saving power in selective call receivers during synchronous mode.

BACKGROUND OF THE INVENTION

Selective call receivers generally are small, portable devices that depend upon limited energy content batteries for their power. The batteries typically must be replaced every two or three months, causing inconvenience and expense to the user. It is therefore desirable to reduce power consumption in selective call receivers.

In a typical paging communication system for a large number of selective call receivers, a central transmitter broadcasts a series of radio signals that each contain a preamble that serves to "wake up" the selective call receivers. A series of batches of information follows each preamble. Each batch contains an initial synchronization codeword and then a series of frames of information. At least one of the information frames in each batch contains address information. A selective call receiver programmed with an address code matching that in the address information is alerted that the frames that follow contain a message intended for that selective call receiver. Circuitry within the selective call receiver can then be energized to receive the message frames. The user is notified by an alert that the message is received.

The receiver circuitry is a major power consumer within the selective call receiver. Conventional battery saving methods can take advantage of the frame assignments and the occurrence of address information at predetermined positions within the Post Office Code Standardization Advisory Group (POCSAG) signalling protocol to de-energize the receiver circuitry or other portions of the selective call receiver at selected times. One such method is described in U.S. Pat. No. 5,376,929. However, typical battery saving methods require that the receiver circuitry be energized during reception of each address information to perform the address correlation. Also, the synchronization codeword preceding each address is typically detected in order to maintain word synchronization.

Therefore, there is a need for a method of reducing power consumption in a selective call receiver that energize selected circuitry within the receiver for shorter periods of time than conventional methods.

DETAILED DESCRIPTION OF THE INVENTION

The invention is particularly suited to increasing the battery save ratio of a Post Office Code Standardization Advisory Group (POCSAG) type signal selective call receiver, or pager. The method of the invention essentially allows the pager to look in its address frame in the POCSAG signal only a predetermined fraction of possible chances. A selective call receiver according to the invention includes a circuit for receiving a paging signal that comprises a preamble and a plurality of batches, each of the batches having a synchronization codeword and a plurality of frames including at least an address information; means for detecting a skip code manifested within one of the batches; means for skipping a predetermined number of batches without decoding any address information contained therein in response to the skip code, the skipping means including means for first retrieving the predetermined number from one of a codeplug in the selective call receiver, and a selected one of the synchronous codeword of the one of the batches, the address information of the one of the batches, and a selected frame of the one of the batches; and means for decoding the address information of a one of the batches next subsequent to the predetermined number of batches, the means for decoding consuming power during the decoding.

Figure 1:
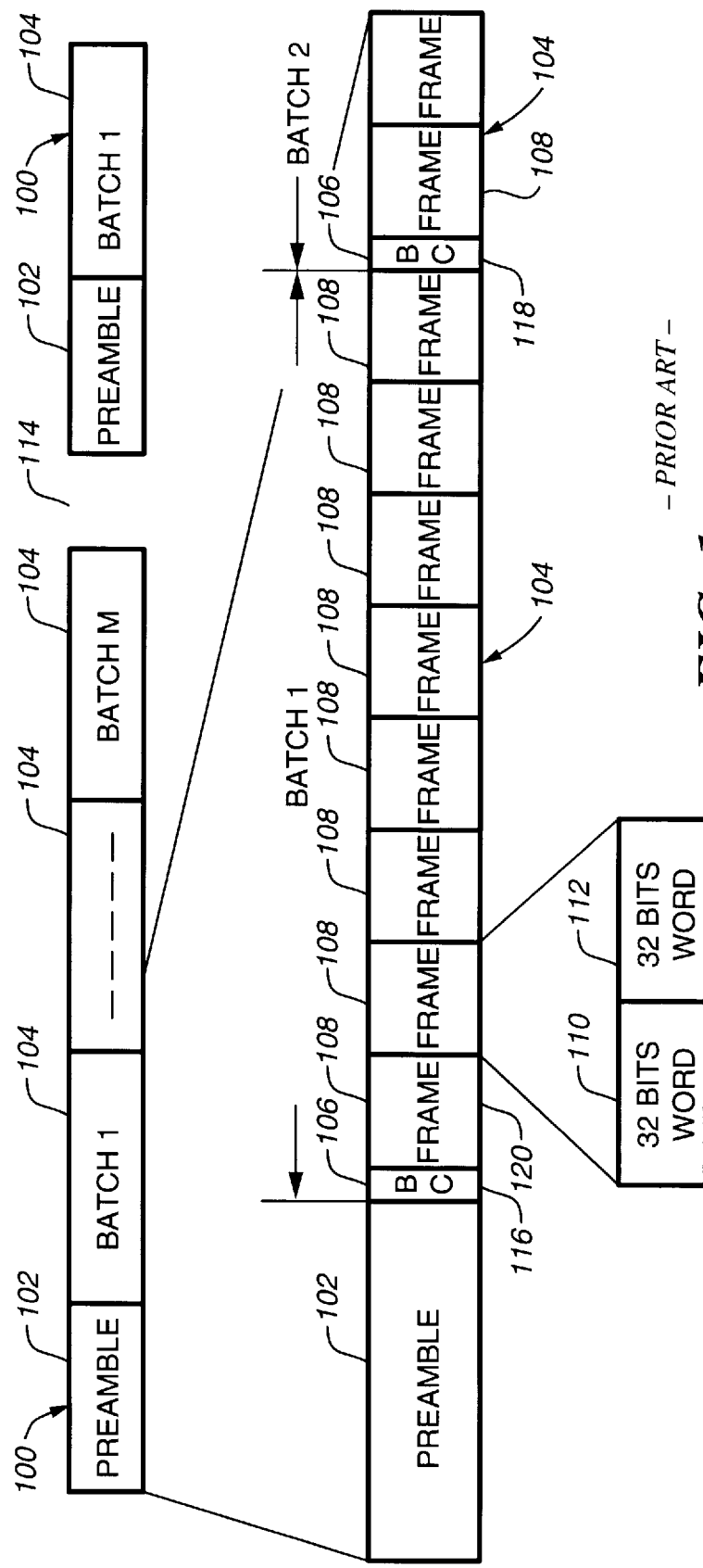
FIG. 1 is a signalling diagram of a prior art POCSAG protocol signal.

Referring to FIG. 1, a signalling diagram of a prior art POCSAG protocol signal 100 is shown. For purposes of illustration, it will be assumed herein that the POCSAG signalling format is utilized, although those of ordinary skill in the art will be able to adapt the system herein described to other signalling formats. The transmission is of a digital format and each POCSAG signal 100 begins with a preamble 102 that is followed by one or more batches 104 of address and information codewords. Each batch 104 begins with a synchronization codeword 106 followed by eight frames 108, each frame consisting of two codewords 110, 112. The codewords can be an address information and/or a message information. The address information are typically located at predetermined positions of each batch 104. Each selective call receiver is preprogrammed with an assigned frame within each batch to look for a matching address. A pause 114 delineates successive POCSAG signals 100.

Figure 2:
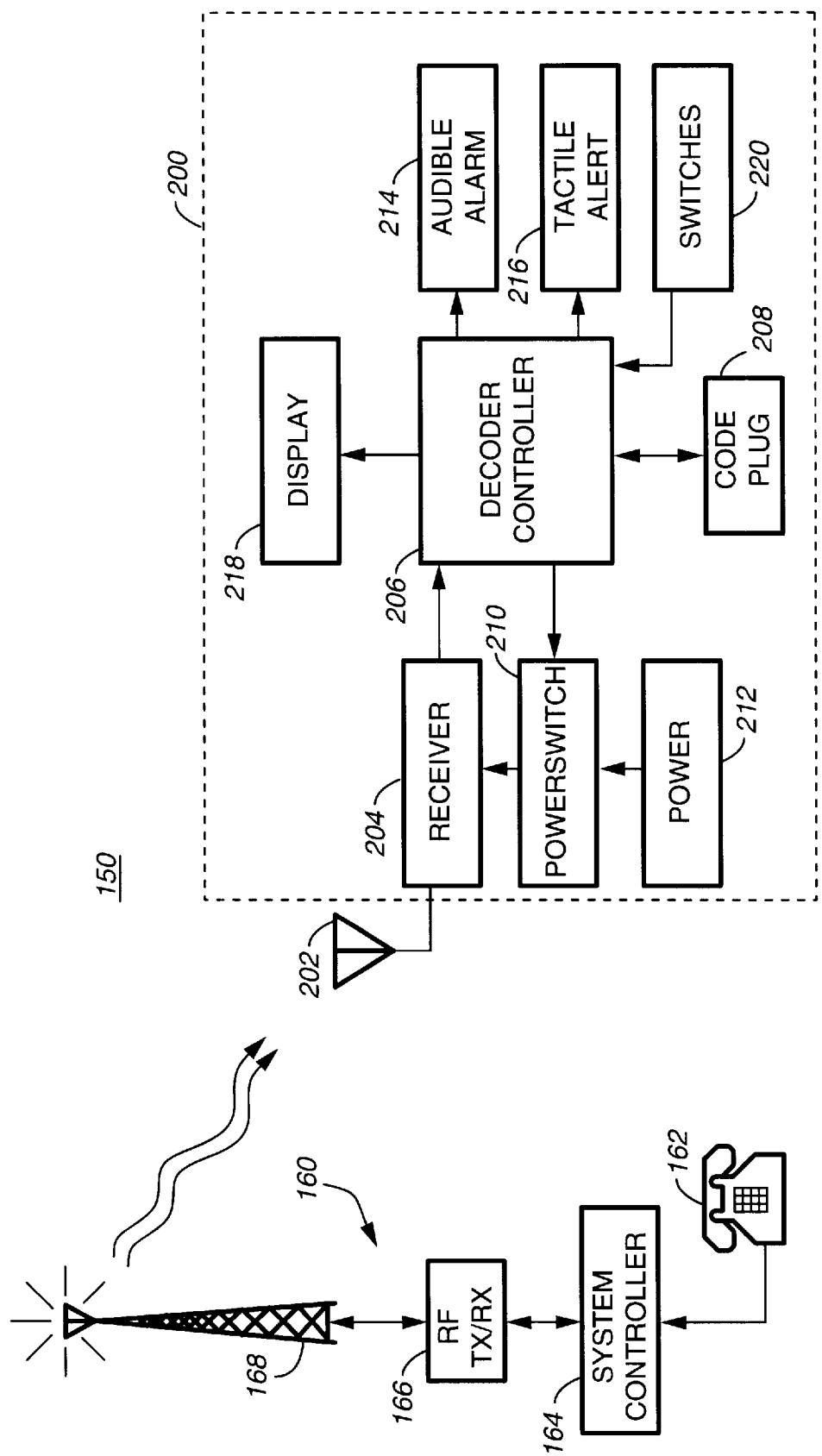
FIG. 2 is an electrical block diagram of a paging system illustrating a paging transmitter and a selective call receiver in accordance with the invention.

FIG. 2 is an electrical block diagram of a paging communication system 150 illustrating a paging transmitter system 160 and a selective call receiver 200 in accordance with the invention. An input device, such as telephone 162, is used for inputting messages or initiating pages via a paging controller 164. The controller 164 can generate the pages to be transmitted to respective selective call receivers 200 according to the POCSAG protocol, as is well known in the art. The controller 164 is coupled to an RF transmitter/receiver 166 that transmits the pages via antenna 168.

The selective call receiver 200 includes an antenna 202 for receiving the radio transmitted signals 100. A receiver circuit 204 processes the RF signal and outputs a digital data stream representative of a demodulated data information to a decoder/controller 206 that processes the information in a manner well known in the art. Decoder/controller 206 can be constructed utilizing a microcomputer, such as, for example, an MC68HC05 microcomputer such as manufactured by Motorola, Inc., and includes an oscillator (not shown) which generates timing signals utilized in the operation of the microcomputer, and memory (not shown) for storing variables derived in processing and for temporary storage of messages as is well known to those of ordinary skill in the art.

Decoder/controller 206 is coupled to a codeplug memory 208 that is programmed with the particular address for that selective call receiver 200. Receiver 200 also includes a power switch 210 coupled between a selected circuit, such as, preferably, receiver circuit 204, and an internal power supply 212, and is controlled by the decoder/controller 206. Power switch 210 permits the decoder/controller 206 to de-energize the selected circuit to save battery power as will be described in more detail hereinafter. A typical selective call receiver can include an audible alert 214 and a tactile alert 216 for notifying the user of an incoming message, a display 218 for viewing a message and user operable switches 220 for controlling various functions of the selective call receiver 200, as is well known in the art.

Figure 3:
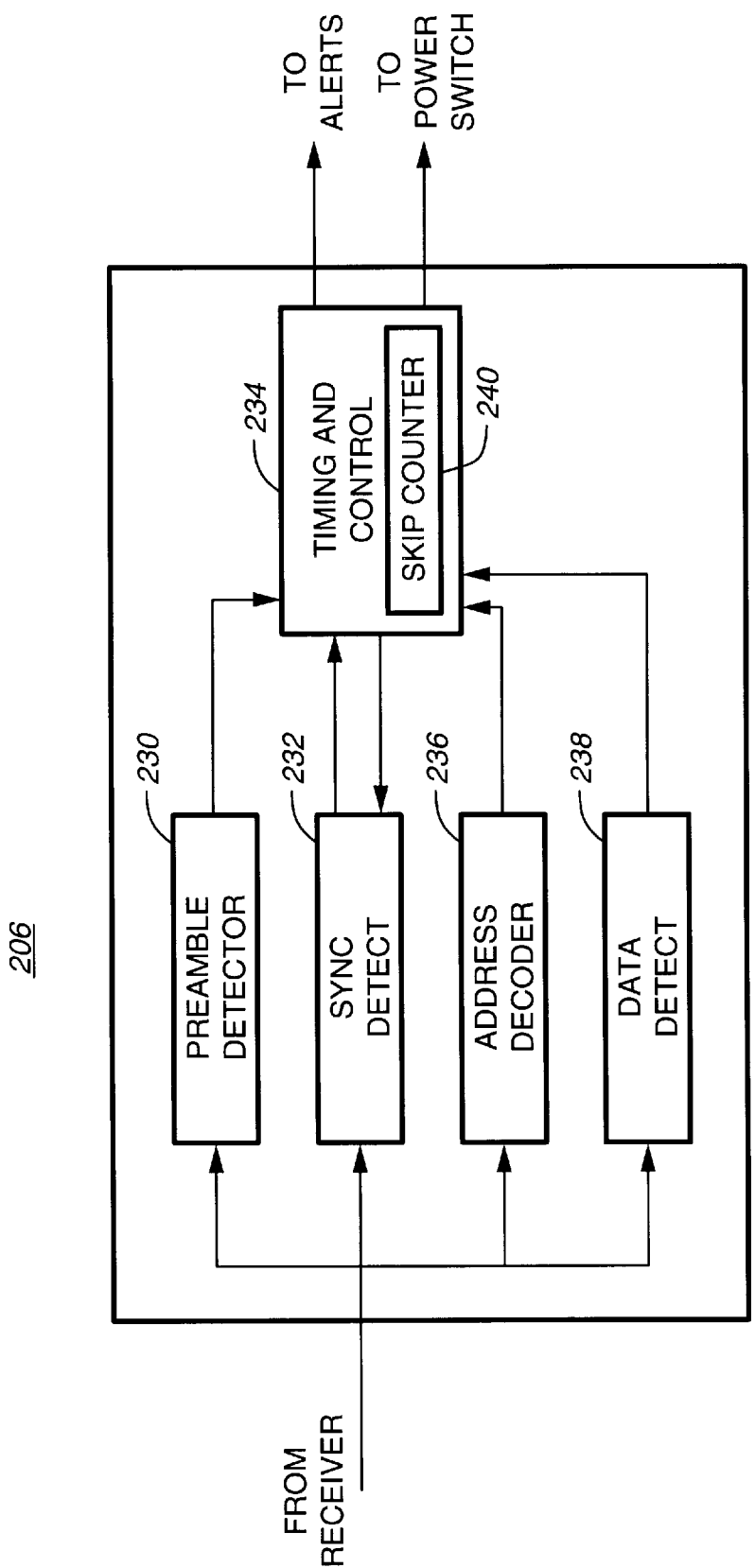
FIG. 3 is an electrical block diagram illustrating the decoding arrangement of the decoder/controller shown in FIG. 2.

Referring to FIG. 3, an electrical block diagram of the decoding arrangement of the decoder/controller 206 is shown. When a signal 100 is received via the receiver circuit 204, a preamble decoder 230 searches the POCSAG signal protocol for preamble 102 in order to obtain preamble bit synchronization. A synchronization codeword detector 232 searches for the synchronization codeword 106 to obtain word synchronization as is well known to one of ordinary skill in the art. A timing and control block 234 is used to send a signal to power switch 210 to control the power to the selected circuit, preferably to the receiver circuit 204, as will be described in more detail hereinafter. An address decoder 236 is used for detecting in the assigned address frame at least the first eight bits of the first address word which is correlated to determine when address is located within two bits of error. When the address is found, timing and control block 234 sends a signal to an alert generator (not shown) that generates an alert signal to signify receipt of a page. Then a data detector 238 detects data, if present, that can be stored in memory (not shown) for later retrieval by the user by operation of switches 220.

Figure 4:
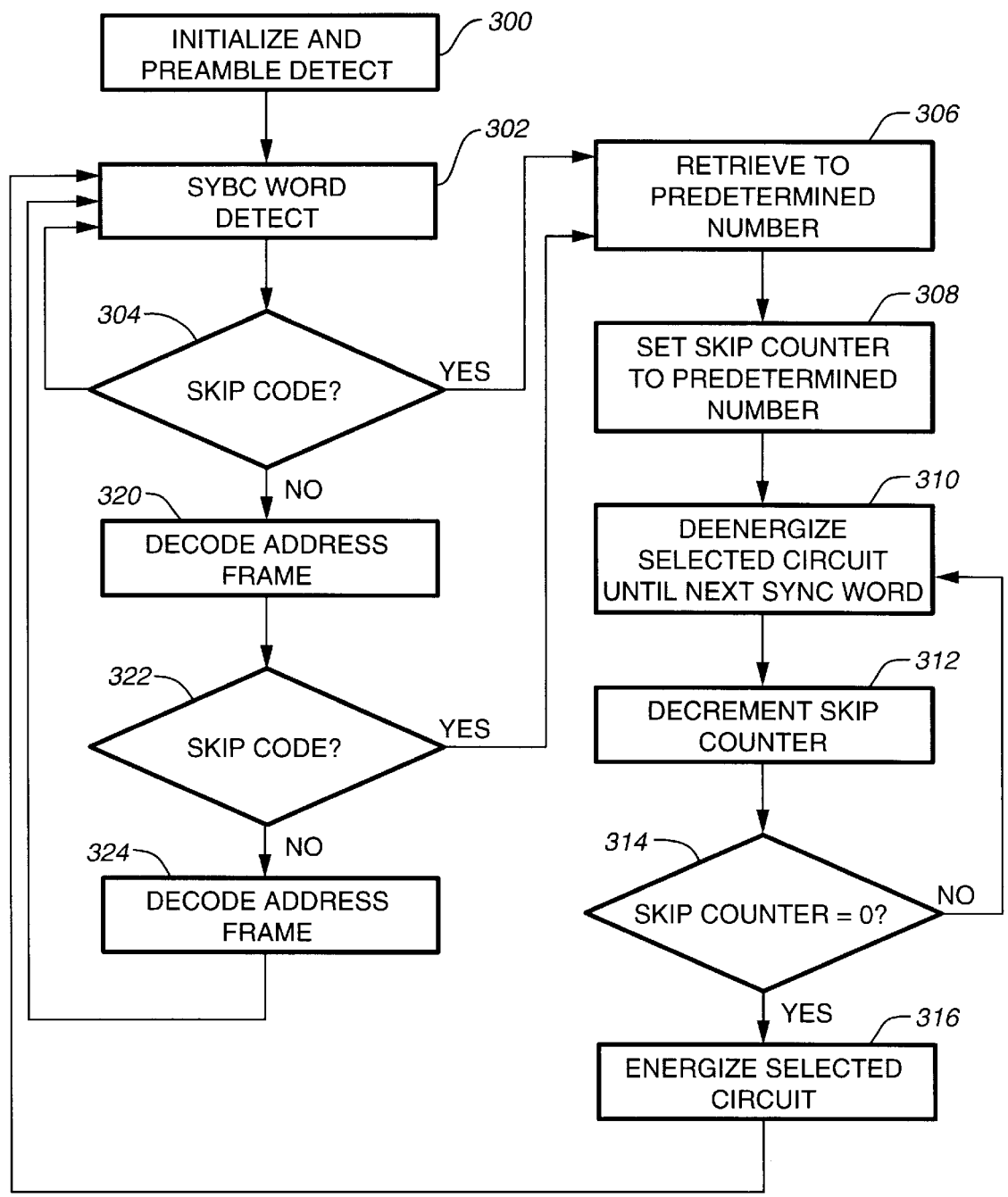
FIG. 4 is a flow diagram illustrating the operation of the selective call receiver of FIG. 3 in accordance with the invention.

Referring now to FIG. 4, a flow diagram illustrates the method of the invention for reducing power consumption in a selective call receiver. The selective call receiver 200 is initialized 300 when a paging signal, such as POCSAG signal 100, is first detected, the paging signal including a preamble 102 and a plurality of batches 104, each of the batches having a synchronization codeword 106 and a plurality of frames 108 including at least an address information 110. The initialization includes the steps of initializing the skip counter 240 (shown in FIG. 3) in the timing and control circuit 234 to zero, providing power to the receiver circuit 204, and detecting the preamble 102 with the preamble detector 230 in a well known manner. Detecting 302 a synchronization codeword 106 in the first one of the batches 106 is then carried out with the sync detector 232 for establishing synchronization. The method further includes the step of determining 304 if there is a skip code present within one of the batches 104. The skip code can be manifested by one of the group consisting of: a non-standard synchronization codeword 116 in the position of a temporally first one of the batches, i.e. the initial synchronization codeword 304; a non-standard synchronization codeword 118 in a second one of the batches subsequent to the first batch; a selected frame 322, preferably frame 0 120 of the one of the batches 104; and an address information 110 of the one of the batches 104. In the former two cases, the detection of the skip code is carried out by the sync detector 232; the data detector 238 determines if the skip code is manifested in the selected, frame; and the address decoder 236 is used to determine if the skip code is manifested in the assigned address frame 110 of the receiver 200.

If there is no skip code present, then the address frame assigned to the selective call receiver 200 is decoded 320 to determine if a message is present, any message retrieved (not shown) and the next synchronization codeword detected 302 in a well known manner of synchronous batch decoding. In response to a skip code present, the skip counter is set and a predetermined number of batches 104 are skipped without decoding any address information contained therein. The step of skipping can include the step of first retrieving 306 the predetermined number from either codeplug 208 or the member of the above-described group manifesting the skip code. The step of skipping includes the steps of: setting a skip counter value to the predetermined number 308; depowering a selected circuit of the selective call receiver until a next synchronization codeword is received 310; decrementing the skip counter 312; and determining if the skip counter is set at zero 314. If the skip counter is not set at zero, then the steps of depowering 310, decrementing 312 and determining 314 are repeated. If the skip counter is set at zero, then the selected circuit is energized 316, the synchronization codeword and the address information of a one of the batches next subsequent to the predetermined number of batches are decoded 320.

Figure 5:
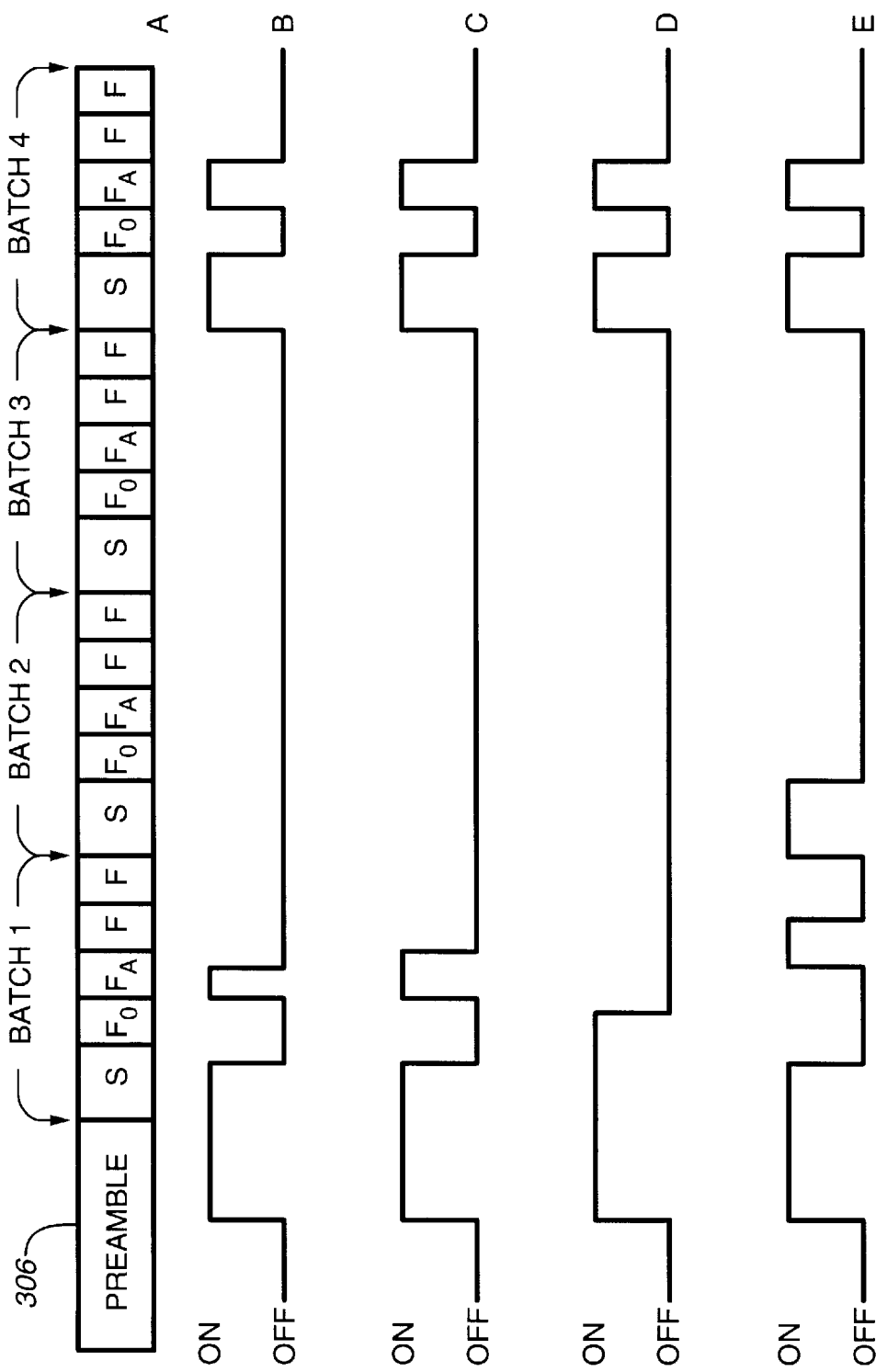
FIG. 5 is signalling diagram of a POCSAG protocol signal, and timing diagrams illustrating the energization and de-energization of a selected circuit of a selective call receiver in response to a skip code signal manifested within one of the batches of the POCSAG protocol signal in accordance with different embodiments of the invention.

The operation of various embodiments of the paging system can be better understood with reference to FIG. 5. FIG. 5A shows a POCSAG signal 100 as described hereinbefore with reference to FIG. 1. A preamble 102 and four batches are shown, however fewer or more batches can be included in the signal 100. Each batch includes a synchronization codeword labeled S, and several frames generally labeled F containing information. A first frame is labeled $F_0$, and a frame containing address information is labeled $F_A$. Although only four frames are shown in the FIG. for each batch, it will be understood that each batch will typically contain several more frames.

FIGS. 5B–5D are timing diagrams, each indicating when power is supplied to the selected circuit for a different embodiment of the invention, the selected circuit being the receiver circuit 204. FIG. 5B illustrates operation of a paging system of the invention when the skip code is manifested in an address frame $F_A$ of the first one of the batches. FIG. 5C illustrates an embodiment wherein the skip code is manifested in the synchronization codeword S of the first one of the batches. FIG. 5D illustrates an embodiment wherein the skip code is manifested in a selected frame of the first one of the batches, in this case the selected frame being the $F_0$.

For FIGS. 5B–D the predetermined number of batches to skip is two, during which time the receiver circuit 204 is de-energized. The receiver circuit 204 is reenergized for detecting and decoding the synchronization codeword of Batch 4 immediately following the skipped Batches 2 and 3. The receiver circuit 204 can be de-energized (with other battery saving methods well known by those of ordinary skill in the art) until the assigned address frame $F_A$ of Batch 4, at which time it is reenergized again such that the address information of frame $F_A$ can be decoded. If the address information matches the programmed address in the selective call receiver 20, then the usual message retrieval routine is carried out. Otherwise, the selective call receiver skips another predetermined number of batches and the pattern is repeated.

FIG. 5E illustrates a case in which the skip code is manifested in the synchronization codeword of Batch 2 instead of the first batch after the preamble 102, and wherein the predetermined number of batches to skip is one.

It will be understood that the preselected number of batches to skip is arbitrary. During the skipping of batches the pager does not look for either its address frame or for synchronization codewords. This can lead to significant power savings for the pager while it is in synchronous mode. For example, if the pager wakes up for one batch and skips five, then the synchronous battery life will increase by almost a factor of five. Assuming that a typical pager has a 45 day battery life with a single AAA type battery. Assume also a medium loaded system, i.e. 50% synchronous and 50% asynchronous. Employing the invention just 75% of the time with the predetermined number of batches to skip at five will improve the synchronous battery life. Of course, skipping batches will increase message latency, however, the increase is minimal. In the example where every two out of three batches are skipped, there is only about a three second latency increase.

As described hereinbefore, the predetermined number of batches to be skipped can be codeplug programmable or given "on the fly" to the pager via encoding the predetermined number in the synchronization codeword, in the address information or in a selected frame, such as frame zero. The advantage of the on the fly method is the ability to further increase battery life when the system loading is low. In any case, if the pager misses the skip code no pages will be lost.

The invention having been disclosed in connection with the foregoing variations and examples, additional variations will now be apparent to those of skill in the art. The invention is not intended to be limited to the exemplary embodiments specifically mentioned, and accordingly reference should be made to the appended claims rather than to the foregoing discussion of exemplary embodiments in order to assess the scope of the invention in which exclusive rights are claimed.

What is claimed is:

1. A method for reducing power consumption in a selective call receiver, the method comprising:

receiving with a receiver circuit a paging signal comprising a preamble followed by a sequence of batches, each of the sequence of batches having a synchronization codeword and a plurality of frames;

detecting a skip code within one of the sequence of batches;

de-energizing the receiver circuit immediately following the detection of the skip code for a predetermined number of batches greater than one designated by the skip code; and energizing the receiver circuit during a next batch following the predetermined number of batches designated by the skip code to enable detection of one of the skip code and address information.

2. The method of claim 1, wherein the skip code is encoded in the synchronization codeword.

3. The method of claim 1, wherein the skip code is encoded in the address information in a frame to which the selected call receiver is assigned.

4. The method of claim 1, wherein the step of skipping includes the step of first retrieving the predetermined number from one of a codeplug in the selective call receiver and a member of the signal group.

5. A method for reducing power consumption in a selective call receiver, the method comprising:

receiving with a receiver circuit a paging signal comprising a preamble followed by a sequence of batches, each of the sequence of batches having a synchronization codeword and a plurality of frames following the synchronization codeword;

detecting the synchronization codeword within one of the sequence of batches, and determining when the synchronization codeword is a non-standard synchronization codeword;

de-energizing the receiver circuit immediately following the detection of the non-standard synchronization codeword for a predetermined number of batches greater than one without decoding any address information contained therein in response to detecting the non-standard synchronization codeword; and energizing the receiver circuit during a next batch following the predetermined number of batches designated by the skip code to enable detection of the synchronization codeword.

6. The method of claim 5, wherein the step of skipping includes the step of retrieving the predetermined number from one of a codeplug in the selective call receiver and the non-standard synchronization codeword.

* * * * *

UNITED STATES PATENT AND TRADEMARK OFFICE
CERTIFICATE OF CORRECTION

PATENT NO. : 5,821,873
DATED : October 13, 1998
INVENTOR(S) : Lerner, et al.

It is certified that error appears in the above-identified patent and that said Letters Patent is hereby corrected as shown below:

On the title page, delete item [57], and insert the following:

Abstract

--A method for reducing the power consumption of a receiver circuit in a selective call receiver includes the steps of receiving a paging signal including a preamble followed by a sequence of batches, each of which includes a synchronization code word and a plurality of frames; detecting a skip code within one of the sequence of batches; de-energizing the receiver circuit immediately following detection of the skip code for a predetermined number of batches greater than one designated by the skip code; and energizing the receiver circuit during a next batch following the predetermined number of batches designated by the skip code to enable detection of one of the skip code and address information. The skip code can be encoded in a portion of the paging signal, such as in the synchronization code word or the address information. The predetermined number of batches is contained in either a code plug or within the paging signal.--

Signed and Sealed this

Sixteenth Day of February, 1999

Attest:

*Attesting Officer*

*Acting Commissioner of Patents and Trademarks*